H. MILSOM.
OZONE MACHINE.
No. 9,976. Reissued Dec. 20, 1881.
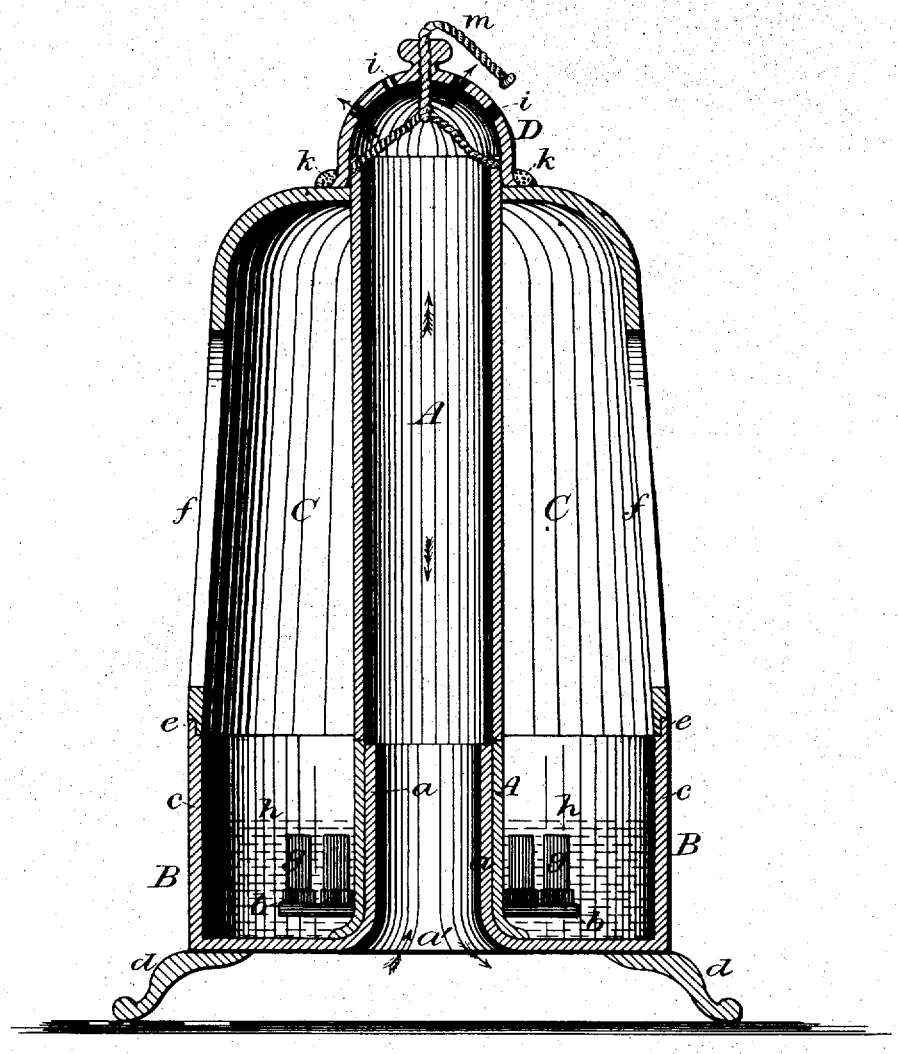
Witnesses,
Henry H. Dieck Jr
William H. Kenyon
Inventor,
Hannah Milsom,
by her Attorney,
Wm. C. Witter

UNITED STATES PATENT OFFICE.

HANNAH MILSOM, OF BUFFALO, NEW YORK.

OZONE-MACHINE.

SPECIFICATION forming part of Reissued Letters Patent No. 9,976, dated December 20, 1881.

Original No. 185,040, dated December 5, 1876. Application for reissue filed November 3, 1880.

*To all whom it may concern:*

Be it known that I, HANNAH MILSOM, of Buffalo, in the county of Erie and State of New York, have made certain Improvements in Ozone-Machines, of which the following is a specification.

This invention consists in providing a simple and cheap machine for the generation, purification, and emission of ozone, in the process by which the above objects are secured, and in the construction, arrangement, and material employed in the several parts.

The invention also consists in purifying the ozone without the use of chemicals or water, except as hereinafter mentioned, by the passage of the ozone through the porous earthenware walls of the machine, all as hereinafter described.

In the drawing the figure represents a vertical sectional elevation of one form of apparatus, in which—

A represents a central tube or open pipe running the entire length of the same. This tube is constructed of porous material, such as earthenware, pottery, or their equivalent, and unglazed, except the lower part, which sits in water. This tube acts as an ozone and air flue, and its walls aid in purifying the ozone. The tube sits on the bottom of a dish or base, B, and over a projecting tube, *a a'*, formed in the center of the bottom of said dish for the free passage of air into or out of the central tube, A.

Around the lower end of the central tube, A, is formed a rim or dish, *b*, on which the phosphorus *g* is placed, or tubes or other receptacles may be employed, into which the phosphorus is put.

The base-dish B is made of any glazed ware or other suitable material capable of holding water, and non-combustible, and has sides *c*, forming a sort of bowl, with feet *d d* on the bottom to raise it from the floor or other place, so that an unimpeded passage of air may be had through the open bottom *a'*. The rim of the dish B is grooved, or has a flange, *e*, so that a close joint can be made with the walls of the ozone-generating chamber C. These walls are also constructed of porous earthenware, or its equivalent, and may have mica windows *f f* in the sides or elsewhere, so that the interior of the machine may at all times be visible and the combustion or oxidation of the phosphorus noticed and controlled, as hereinafter more particularly stated. The walls of this chamber C, being made of porous earthenware, or its equivalent, aid in the purification of the ozone in the same way as the walls of the tube A, thus securing a greater extent of porous material, through which the operation may proceed, it being of the essence of my invention that such walls permit the egress of ozone and the ingress of air through them, and confine within them the phosphorous acid and other impurities generated in the evolution of ozone, as hereinafter described.

In the form represented in the drawing the ozone-purifying chamber is rounded over at the top, with an opening therein sufficient to inclose the top of the central tube, A. Above this is set a removable dome or cap, D, made high enough to give an upright play to the tube A, which is raised or lowered by a cord or wire, *m*, or other suitable device, to increase or diminish the height of the phosphorus *g* above the surface of the water contained in the base B, or to submerge the phosphorus altogether below the surface of the water. In the drawing the phosphorous sticks are shown below the water-level *h*, which is the case when the machine is not in use or operation. The raising or lowering of the central tube, A, raises or lowers the phosphorus with it, and by this means the height of the phosphorus above the surface of the water, and consequently the rate of its combustion or oxidation, is controlled. The windows *f f* are for the purpose of noting this from the outside, as before stated.

The cover or dome D has several openings or perforations, *i i*, therein for the escape of the ozone which passes from the chamber C through the porous walls of the tube A. This ozone may also escape at *a'*.

The foregoing describes the general construction and arrangement of one form of the apparatus and its parts; but particular stress is laid on the porosity of the material out of which the walls of the tube A and chamber C are made—viz., porous earthenware, or its equivalent—as this permits an inward passage of air and outward passage of ozone through its pores, and does not permit the passage of phosphorous acid, as, no trace of acid being found outside, pure ozone being thereby emitted, the acid dropping down inside into the water in the base-dish B, whence it may be drawn off and fresh water supplied when necessary.

The operation is as follows: The central tube or pipe, A, is raised sufficiently to expose the phosphorus slightly above the water-level *h*, when the slow oxidation of the phosphorus commences, the fumes arising in a cloud-like vapor into the ozone-separating chamber C, where they mingle with the air constantly coming therein through the walls, the phosphorous acid and other deleterious substances dropping into the water below, and the ozone passing through the outer walls of chamber C directly into the room and through the walls of the central tube, A, and out at the bottom *a'* or top of said tube, according to the draft. Air and ozone are therefore constantly passing through these walls when the apparatus is in operation, which is an important feature of my invention, as I believe myself to be the first who ever utilized this material for this purpose. I claim that these porous walls, made of this or similar ware, aid greatly in freeing the ozone from the acid, all tests showing this to be the case. No other purifying medium, such as chemicals, &c., is employed in this apparatus.

A suitable packing, *k*, is used around the junction of the cap D, the tube A, and chamber C, also where the chamber C and base B join, if necessary.

By this machine the expense of an ozone-generator is greatly reduced, a safer, better, and simpler apparatus is supplied, and a better quality of ozone is produced.

I disclaim as "porous" cloth, wood, wire work, and such substances, and confine my meaning to earthenware or other unglazed ware or pottery.

The form of the machine is not important so long as the essential parts are represented. By this construction the ozone generated has full egress all around through the walls of chamber C and through the walls of the tube A and out at either its top or bottom, according to the draft, as stated.

In a large machine several pipes A may be employed with corresponding openings in the bottom of the base B and phosphorus-holders attached thereto. For ordinary machines one central pipe will be sufficient, as shown.

The base-bowl B and ozone-chamber walls C may be made of metal having a non-corrosive surface, like porcelain, &c., which will make the machine less liable to damage or breakage by accident. They will have the same construction otherwise, and the central porous tube, A, will then do all the work of purifying, which, it is thought, will be sufficient for a small machine.

The construction of parts, the material employed, and the fact of purifying ozone without the aid of chemicals of any sort, cloths, or water (except that used in the base-dish B) are the important features of my invention.

I claim as new—

1. The ozone apparatus constructed with the base B, with the tube opening or openings *a a'* therein, the central tube or tubes, A, with the phosphorus-holder *b*, the separating ozone-chamber C, and cap D, substantially as herein shown and described.

2. The process herein described, which consists in the generation, purification, and emission of ozone by the slow oxidation of phosphorus in a chamber with inclosing walls of porous material, such as earthenware, or its equivalent, whereby the separation and retention of the acid fumes and the egress of ozone are effected, substantially as herein shown and described.

In witness whereof I have hereunto signed my name in the presence of two subscribing witnesses.

HANNAH MILSOM.

Witnesses:

EDWARD CONNER,
JAMES KEARNEY.